(12) United States Patent
Bourgeois et al.

(10) Patent No.: US 9,808,057 B2
(45) Date of Patent: Nov. 7, 2017

(54) MATERIAL OF STORAGE DEVICE, STORAGE DEVICE AND A BAG THEREOF

(71) Applicants: Michael L. Jean-Raymond Bourgeois, Tsuen Wan (HK); Cheuk Yiu Wong, Tsuen Wan (HK)

(72) Inventors: Michael L. Jean-Raymond Bourgeois, Tsuen Wan (HK); Cheuk Yiu Wong, Tsuen Wan (HK)

(73) Assignee: Michael L. Jean-Raymond Bourgeois, Tsuen Wan (HK)

( * ) Notice: Subject to any disclaimer, the term of this patent is extended or adjusted under 35 U.S.C. 154(b) by 19 days.

(21) Appl. No.: 14/678,298

(22) Filed: Apr. 3, 2015

(65) Prior Publication Data

US 2016/0198820 A1    Jul. 14, 2016

(30) Foreign Application Priority Data

Jan. 8, 2015   (HK) ................... 15100210.7

(51) Int. Cl.
*A45C 5/02*    (2006.01)
*A45C 7/00*    (2006.01)
(Continued)

(52) U.S. Cl.
CPC .............. *A45C 5/02* (2013.01); *A45C 7/0022* (2013.01); *A45C 7/0036* (2013.01); *A45C 7/0054* (2013.01); *A45C 13/10* (2013.01); *B32B 1/00* (2013.01); *B32B 1/02* (2013.01); *B32B 3/02* (2013.01); *B32B 7/08* (2013.01); *B32B 7/12* (2013.01); *B32B 27/08* (2013.01); *B32B 27/306* (2013.01); *B32B 27/40* (2013.01); *B32B 27/42* (2013.01); *B32B 2307/536* (2013.01);
(Continued)

(58) Field of Classification Search
CPC ............ A45C 5/03; A45C 7/0036; A45C 5/02
USPC ..... 190/103, 107, 125, 903, 907; 220/6, 666; 428/221
See application file for complete search history.

(56) References Cited

U.S. PATENT DOCUMENTS 4,584,229 A * 4/1986 Bourelier .......... B32B 17/10018
296/84.1
4,854,432 A * 8/1989 Carpenter .............. A45C 13/02
190/110

(Continued)

*Primary Examiner* — Sue A Weaver
(74) *Attorney, Agent, or Firm* — Muncy, Geissler, Olds & Lowe, P.C.

(57) ABSTRACT

The present invention discloses a material of storage device, a storage device and a bag of the same. The material of storage device comprise a composite layer composed of polyurethane layer, polyurethane-polyurea copolymer layer, ethylene-vinyl acetate copolymer layer materials. The storage device is formed by the above material, which can be folded in vertical direction and/or horizontal direction; the storage device has a plurality of cavity-shaped storage chamber. A bag formed by the storage device is disclosed. The material and structure of the present invention has the features of waterproof, light weight, proper hardness, capability to fold, high wearing feature, scratch resistant. The storing spatial pattern of the said storage device could be adjusted when needed; it could effectively protect the stored items. The provided bag could be opened partially, allowing quickly and conveniently access to the stored items, the storage space in the bag is designed for a better protection of stored items.

5 Claims, 3 Drawing Sheets

(51) Int. Cl.
　　　*A45C 13/10*　　(2006.01)
　　　*B32B 27/40*　　(2006.01)
　　　*B32B 7/08*　　(2006.01)
　　　*B32B 7/12*　　(2006.01)
　　　*B32B 27/08*　　(2006.01)
　　　*B32B 27/30*　　(2006.01)
　　　*B32B 27/42*　　(2006.01)
　　　*B32B 1/00*　　(2006.01)
　　　*B32B 1/02*　　(2006.01)
　　　*B32B 3/02*　　(2006.01)
(52) U.S. Cl.
　　　CPC ... *B32B 2307/546* (2013.01); *B32B 2307/584* (2013.01); *B32B 2307/7265* (2013.01); *B32B 2439/46* (2013.01); *B32B 2439/62* (2013.01)

(56) References Cited

U.S. PATENT DOCUMENTS

| | | | | |
|---|---|---|---|---|
| 5,284,542 A * | 2/1994 | Lee | ............ | A45C 5/02 156/242 |
| 6,481,574 B1 * | 11/2002 | Pakosh | ............ | A45C 5/02 190/107 |
| 6,499,575 B1 * | 12/2002 | Tsai | ............ | A45C 5/02 150/107 |
| 7,021,437 B2 * | 4/2006 | Ghiassi | ............ | A45C 13/36 190/103 |
| 7,500,547 B2 * | 3/2009 | Bettua | ............ | A45C 5/14 190/103 |
| 8,978,850 B2 * | 3/2015 | Bettua | ............ | A45C 7/0068 190/103 |
| 9,038,679 B2 * | 5/2015 | Marquez-Bottome | | A45C 13/002 150/103 |
| 2002/0023812 A1 * | 2/2002 | Bernbaum | ............ | A45C 3/00 190/111 |
| 2012/0024721 A1 * | 2/2012 | Melamed | ............ | A45C 7/0068 206/6.1 |
| 2012/0285781 A1 * | 11/2012 | Bettua | ............ | A45C 5/02 190/18 A |
| 2013/0213752 A1 * | 8/2013 | Meersschaert | ............ | A45C 5/02 190/125 |
| 2014/0299429 A1 * | 10/2014 | Tseng | ............ | A45C 5/02 190/103 |

\* cited by examiner

MATERIAL OF STORAGE DEVICE, STORAGE DEVICE AND A BAG THEREOF

TECHNICAL FIELD OF THE INVENTION

The present invention relates to the field of storage device for a bag, and more particularly, a material of the storage device, a storage device and a bag and/or suitcase thereof.

BACKGROUND OF THE INVENTION

Currently, most of the ordinary bags in the market are unable to fold, those can be fold is too soft which poor in the function of protecting. Besides, there are suitcases or bags with integrated inner space, which is not easy to adjust the spatial pattern, for example, when putting in a small item, since there's no specific fixed small space for storage, so it's not easy to fix the small item, as a result, such small item couldn't have better protection and easy to be broken. Usually, the users need to open the entire suitcase to access such small item. The current suitcases make users hard to quickly, conveniently and safety store or pick up stuff in the suitcase. If they want to pick or put stuff, they need to open the entire suitcase or the inner space of the suitcase, and the inner space of suitcases or bags do not have corresponding spatial design based on the need. The inner storage space tends to be an entire space, which is not able for users to open them partially for picking or putting stuff.

SUMMARY OF THE INVENTION

The object of the present invention is to overcome the aforesaid shortcomings of the prior art, providing a material of storage device, storage device and bags thereof, so as to efficiently improve the usage of the inner space of bags/suitcases, and allow the users to pick up and put stuff in a more convenient manner and protect the stored items from damage.

In one aspect of the invention, the present invention provide a material of storage device which comprises a composite layer composed of polyurethane layer, polyurethane-polyurea copolymer layer, ethylene-vinyl acetate copolymer layer materials.

In another aspect of the invention, the present invention provide a storage device, which formed by the composite layer, such composite layer includes the polyurethane layer, polyurethane-polyurea copolymer layer, ethylene-vinyl acetate copolymer layer.

Preferably, the storage device has a plurality of folding auxiliary structures that can be folded in vertical direction and/or horizontal direction.

Preferably, the storage device has a plurality of cavity-shaped storage chamber.

Preferably, the folding auxiliary structure is selected from the group consisted of a convex groove, a concave groove and an arc-shaped groove and/or combination thereof.

In one embodiment of the invention, the storage device has a plurality of fastening members, located at the edge, for fastening the storage device, in which the fastening member is selected from the group consisting of a snap joint, a bonding joint, a Velcro, a zip and/or the combination thereof.

In yet another aspect of the invention, a bag is provided which is formed by folding the storage device along the folding auxiliary structures, followed by fastening the storage device; or the bag is formed by fastening two storage devices via the fastening members.

Preferably, a storage optimization pouch, that is used to integrate with the storage chamber, is disposed inside the cover of the bag.

Preferably, a fixation structure that integrates the storage optimization pouch is located inside the bag, in which the fixation structure is selected from the group consisting of a snap joint, a bonding joint, a velcro, a zip and/or the combination thereof.

Compared with the existing technologies in the art, the material structure newly provided by the present invention has the features of waterproof, light weight, proper hardness, capability to fold, high wearing feature, scratch resistant. The provided storage device could adjust the storing spatial pattern based on the needs, and it could also effectively protect the stored items. The provided bag could be opened partially, allowing quickly and conveniently access to the stored items, the storage space in the bag is designed for a better protection of stored items.

BRIEF DESCRIPTION OF THE DRAWINGS

The features of the present invention are presented by the accompanying drawings. The invention, together with the advantages thereof may be best understood by reference to the following description taken in conjunction with the accompany drawings, wherein like reference signs identify like elements, and wherein.

DETAILED DESCRIPTION OF THE INVENTION

For better understanding of the present invention, detailed description of the technology is set forth as below in combination the accompany drawings. It should be noted that all the examples below are only to describe this invention, not to limit this invention.

Figure 1:
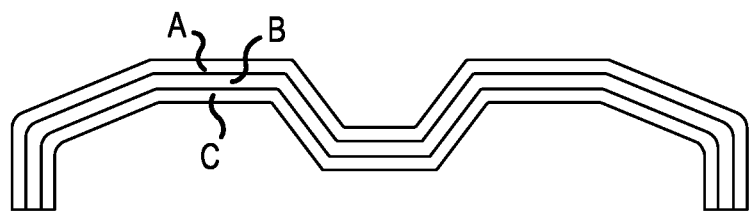
FIG. 1 is a schematic view of the material of the storage device according to one embodiment of the present invention.

As shown in FIG. 1, a material of storage item is provided, the material structure of storage item is a composite layer composed of polyurethane layer A, polyurethane-polyurea copolymer layer B, ethylene-vinyl acetate copolymer layer C materials.

Preferably, the polyurethane layer A is the outermost layer, the polyurethane-polyurea copolymer layer B is the middle layer and the ethylene-vinyl acetate copolymer layer C is the bottom layer. This composite layer material of the storage device is made under the condition of hot and pressure with glue, such composite layer material has the features of waterproof, light weight, proper hardness, capability to fold, high wearing feature and scratch resistant.

Figure 2:
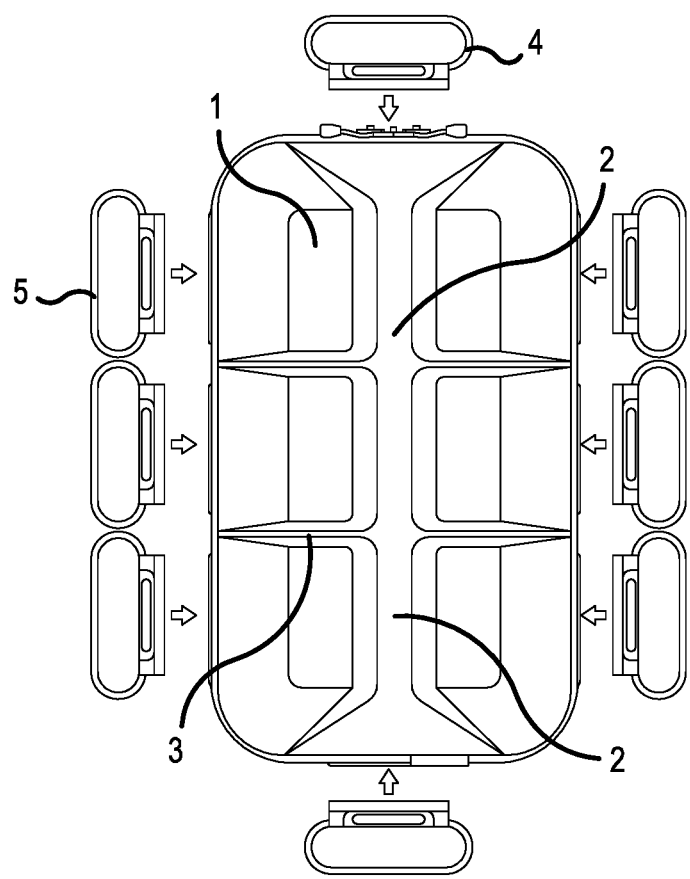
FIG. 2 is a perspective schematic view of the storage device according to another embodiment of the present invention.

The present invention also provides a storage device, the material of the storage device includes the composite layer, such composite layers includes the polyurethane layer A, polyurethane-polyurea copolymer layer B, ethylene-vinyl acetate copolymer layer C, such storage device has multiple folding auxiliary structures that can be folded in vertical direction and/or horizontal direction, as shown in FIG. 2, where FIG. 2 is a perspective schematic view of such storage device.

FIG. 2 includes two types of folding auxiliary structures, the folding auxiliary structure in vertical direction is the first folding auxiliary structure 2, and the folding auxiliary structure in horizontal direction is the second folding auxiliary structure 3.

Meanwhile, the first folding auxiliary structure 2 and the second folding auxiliary structure 3 can separate the space of storage device into multiple adjacent storage chambers 1. Of course, if desired, more first folding auxiliary structure 2 or second folding auxiliary structure 3 or other separating members could be disposed in the storage device, so as to separate the storage device into more storage chambers 1, the said storage chamber is cavity-shaped.

Specifically, the shape of the first folding auxiliary structure 2, second folding auxiliary structure 3 can be convex groove, concave groove and arc-shaped groove or their combination. Of course they can be in other shapes, as long as they can assist the folding of the storage device, which is omitted herein.

A first fastening member 5 and a second fastening member 4 of the fastening members are provided on the edge of the storage device, the first fastening member 5 is set in vertical direction, and the second fastening member 4 is set in horizontal direction. The first fastening member 5 and the second fastening member 4 are selected from snap joint, bonding joint, velcro, zip or their combination. The connection relationship between the first fastening member 5 and second fastening member 4 is flexible, for example, it can be fixed on the storage device when using, or removed when not using, the specific connecting method could be fixed and non-removable, or removable. Based on the needs, the fastening member may also be disposed on the third axial directions of the storage device.

Figure 3:
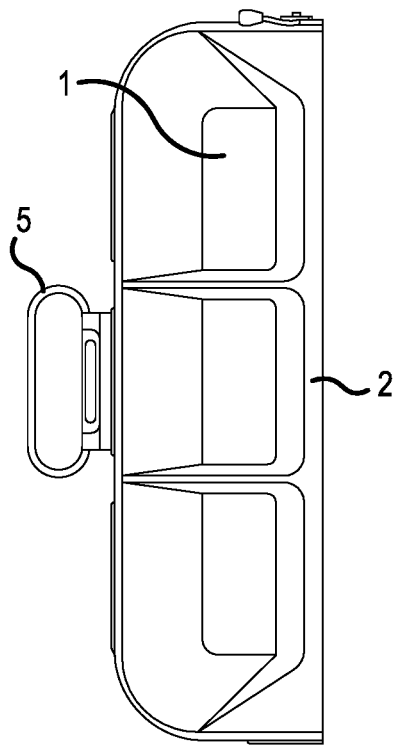
FIG. 3 is a perspective schematic view of the storage device according to another embodiment of the present invention.
Figure 4:
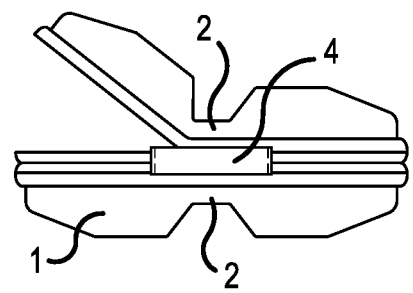
FIG. 4 is a perspective schematic view of the storage device according to another embodiment of the present invention.

The present invention also provides a bag which the foresaid storage device is folded along the first folding auxiliary structure 2, as shown in FIG. 3; or the bag is formed by connecting two storage devices via the fastening members, as shown in FIG. 4.

The bag shown in FIG. 3 is a storage device folded along the first folding auxiliary structure 2. Specifically, by folding along the first folding auxiliary structure 2, the multiple storage chambers 1 are separated into two. The storage chambers 1 on the left of the first folding auxiliary structure 2 being the cover, while the storage chambers on the right of the first folding auxiliary structure 2 being the bottom (the cover and bottom parts are symmetrical and can be interchanged). The first fastening members 5 on the left and right edge of another storage device are used to fasten the bottom and cover parts, so as to form a bag. The first fastening members 5 can form a closed structure after fastening, and may also be non-closed structure, such closed or non-closed structure can be used as handle, user can conveniently move such bag by lifting or pulling such closed or non-closed structure. The first fastening member 5 can be a snap joint, a bonding joint, a velcro, a zip and their combination.

When in use, since the material of the storage device is relatively soft, by opening the bag cover on top of the corresponding storage chamber, the fastening member adjacent to the storage chamber 1 is also opened. Putting stuff in the corresponding storage chamber 1 does not require the opening of the fastening member of other nearby storage chambers, which means the user does not need to open the bag cover on top of other storage chambers. The users only need to open or fasten the corresponding fastening member when picking or putting stuff, rather than opening or fastening the entire bag cover. This bag therefore provides convenience in accessing the storage chamber.

When the aforesaid bag has two storage devices that are fastened in multiple first fastening members 5, there can be two implementation examples.

The first example, as shown in FIG. 4, is specifically uses two storage devices to join the corresponding first fastening member 5 to fasten and fix the two storage devices, one storage device will be the cover and the other storage device will be the bottom, thus the second fastening member 4 will serve as the handle of bag, so as to form a bag. The first fastening member 5 can be a snap joint, a bonding joint, a velcro, or a zip or a combination thereof. The second fastening member 4 is a handle structure.

When in use, since the material of the storage device is relatively soft, by opening the bag cover on top of the corresponding storage chamber, the fastening member adjacent to the storage chamber 1 is also opened. Putting stuff in the corresponding storage chamber 1 does not require the opening of the fastening member of other nearby storage chambers, which means the user does not need to open the bag cover on top of other storage chambers. The users only need to open or fasten the corresponding fastening member when picking or putting stuff, rather than opening or fastening the entire bag cover. This bag therefore provides convenience in accessing the storage chamber.

Figure 5:
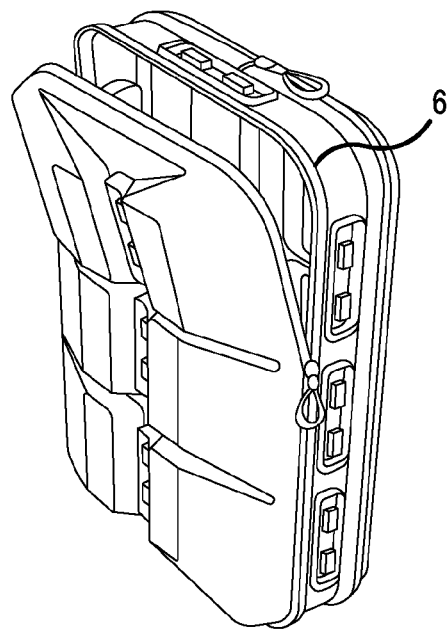
FIG. 5 is a schematic view of the storage device according to another embodiment of the present invention.

Another specific function is to use a partition 6, connecting the two storage devices symmetrical and closed to the partition respectively, as shown in FIG. 5. Using the first fastening member 5 to fasten and fix each storage device onto the partition 6. One of the storage devices is the cover part and the other storage device is the bottom part, so as to form a bag. The first fastening member 5 can be a snap joint, a bonding joint, a velcro, and zip or a combination thereof. The second fastening member 4 is in handle structure.

When in use, since the material of the storage device is relatively soft, by opening the bag cover on top of the corresponding storage chamber, the fastening member adjacent to the storage chamber 1 is also opened. Putting stuff in the corresponding storage chamber 1 does not require the opening of the fastening member of other nearby storage chambers, which means the user does not need to open the bag cover on top of other storage chambers. The users only need to open or fasten the corresponding fastening member when picking or putting stuff, rather than opening or fastening the entire bag cover. This bag therefore provides convenience in accessing the storage chamber.

Figure 6:
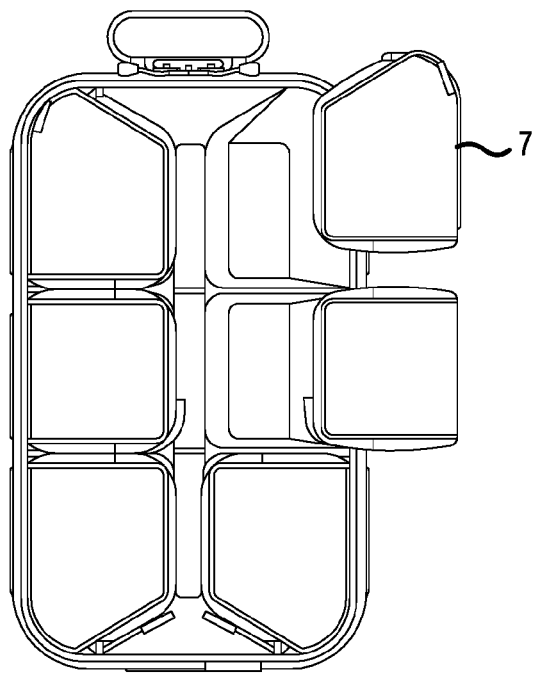
FIG. 6 is a schematic view of the storage optimization pouches according to another embodiment of the present invention.

Preferably, the cover of the bag has the storage optimization pouch 7 which is used for integrating with the storage chamber, as shown in FIG. 6. In order to optimize the use of the storage chamber 1, a storage optimization pouch 7 is disposed inside the cover part of the bag to integrate with the storage chamber. The storage optimization pouch 7 can be built to match the shape of the storage chamber 1. It can be fit into the storage chamber 1. Firstly put the stuff in the storage optimization pouch 7, and then put the storage optimization pouch 7 in the storage chamber 1.

When in use, since the material of the storage device is relatively soft, by opening the bag cover on top of the corresponding storage chamber, the fastening member adjacent to the storage chamber 1 is also opened. Putting stuff inside the storage optimization pouch 7 in the corresponding storage chamber 1 does not require the opening of the fastening member of other nearby storage chambers, which means the user does not need to open the bag cover on top of other storage chambers as well as other storage optimization pouch 7. The users only need to open or fasten the corresponding fastening member when picking or putting stuff, rather than opening or fastening the entire bag cover. This bag therefore provides convenience in accessing the storage chamber.

Preferably, in order to better use the storage device, and prevent the storage device to waggle at the bottom or inside of the bag, and affect the fixation of stuff, the fixation structure is provided on the inside of the bag that integrates with the storage device. The fixed structure can be a snap joint, a bonding joint, a velcro, and zip or their combination. The fixed structure is used to fix the storage optimization pouch 7 onto the inside of the storage device or other positions inside the bag.

Preferably, in order to better use the storage device, a buffer layer is provided in the cover of the bag that integrates the storage chamber or the storage optimization pouch 7. In case of external force, the buffer layer in between the storage chamber and the storage optimization pouch 7 will protect the stuff in the storage chamber and storage optimization pouch 7 from damage.

Besides, the bag provided in the implementation example of the present invention could also be embedded in the ordinary bags on the market as the outer accessory of the existing bags in the market, so as to become an outer device that optimizes the bags in the market. Specifically, the boundary dimension of the storage device should correspond to the outer dimension of the bag. When in use, install the storage device outside the bag, to put stuff inside the storage device, the user shall base on the size of stuff to open the corresponding bag cover on the storage chamber 1, and put the stuff in the corresponding storage chamber 1.

Because the storage device or storage chamber have relatively fixed position, and its material is relatively soft, user doesn't need to open the entire bag cover for picking and putting stuff but only needs to open part of the bag cover. Specifically, opening the corresponding fastening member will allow the user to access the corresponding storage chamber. The users only need to open or fasten the corresponding fastening member when picking or putting stuff, rather than opening or fastening the entire bag cover. This bag therefore provides convenience in accessing the storage chamber.

The material structure newly provided by the present invention has the features of waterproof, light weight, proper hardness, capability to fold, high wearing feature, scratch resistant. The storing spatial pattern of the said storage device could be adjusted when needed; it could effectively protect the stored items. The provided bag could be opened partially, allowing quickly and conveniently access to the stored items, the storage space in the bag is designed for a better protection of stored items.

It will be obvious to those skilled in the art that various changes and modifications can be made without departing from the true spirit and scope of the invention. However, it should be appreciated that all the embodiments of the present invention described above are illustrative only, and all the changes and modifications made by those skilled in the art are covered by the appended claims.

What is claimed is:

1. A storage device, comprising:
   a composite layer composed of polyurethane layer, polyurethane-polyurea copolymer layer, and ethylene-vinyl acetate copolymer layer;
   a plurality of cavity-shaped storage chambers, and a plurality of folding auxiliary structures comprising at least one first folding auxiliary structure extending in a vertical direction and at least one second folding auxiliary structure extending in a horizontal direction, wherein
   the plurality of folding auxiliary structures separates the plurality of cavity-shaped storage chambers individually; and
   at least one fastening members which is disposed at at least one edge of the storage device.

2. A bag which is formed by folding the storage device according to claim 1 at one of the plurality of folding auxiliary structures, followed by fastening the storage device via the fastening member.

3. A bag which is formed by fastening two storage devices according to claim 1 via the fastening members.

4. A bag, comprising:
   a partition having at least a first side; and
   one storage device according to claim 1 which are fastened on the first side, wherein
   a desired number of the plurality of cavity-shaped storage chambers is openable by folding the bag at at least one of the plurality of folding auxiliary structures, the desired number of the plurality of cavity-shaped storage chambers opening outwardly in the vertical direction and/or horizontal direction by separating away from the partition to provide an easy and quick access to the bag.

5. The bag according to claim 4, wherein the partition has a second side opposite from the first side, and another storage device is fastened on the second side.

* * * * *